(12) United States Patent
Sheldon et al.

(10) Patent No.: US 9,341,865 B2
(45) Date of Patent: May 17, 2016

(54) EYEWEAR HAVING MAGNETIC CLIP-ON LENSES

(71) Applicant: Brent Sheldon, Montreal (CA)

(72) Inventors: Brent Sheldon, Montreal (CA); Robert Katz, Montreal (CA); Sylvain Duchesne, Bromont (CA)

(73) Assignee: Brent Sheldon, Miami Beach, FL (US)

( * ) Notice: Subject to any disclaimer, the term of this patent is extended or adjusted under 35 U.S.C. 154(b) by 0 days.

(21) Appl. No.: 14/338,919

(22) Filed: Jul. 23, 2014

(65) Prior Publication Data

US 2016/0026003 A1    Jan. 28, 2016

(51) Int. Cl.
*G02C 7/08* (2006.01)

(52) U.S. Cl.
CPC ............ *G02C 7/086* (2013.01); *G02C 2202/02* (2013.01)

(58) Field of Classification Search
CPC .......... G02C 7/08; G02C 7/086; G02C 7/088; G02C 9/00; G02C 9/04
USPC ................................................ 351/47, 57, 58
See application file for complete search history.

(56) References Cited

U.S. PATENT DOCUMENTS

| | | | |
|---|---|---|---|
| 5,696,571 A | 12/1997 | Spencer et al. | |
| 5,737,054 A * | 4/1998 | Chao | G02C 9/00 351/47 |
| 5,867,244 A | 2/1999 | Martin | |
| 6,053,611 A | 4/2000 | Ku | |
| 6,109,747 A * | 8/2000 | Chao | G02C 9/00 351/47 |
| 6,139,142 A | 10/2000 | Zelman | |
| 6,170,949 B1 | 1/2001 | Mauch | |
| 6,331,057 B1 | 12/2001 | Strube | |
| 6,354,703 B1 | 3/2002 | Sadler | |
| 6,412,941 B1 | 7/2002 | Xiao | |
| 6,540,348 B1 * | 4/2003 | Xie | G02C 9/00 351/47 |
| 6,698,881 B1 | 3/2004 | Kim | |
| 6,783,234 B1 | 8/2004 | Hong | |
| 6,820,976 B2 | 11/2004 | Ifergan | |
| 6,926,402 B1 | 8/2005 | Chen | |
| RE39,066 E | 4/2006 | Mauch | |
| 7,040,750 B2 | 5/2006 | Smith et al. | |
| 7,108,371 B1 | 9/2006 | Ifergan | |
| 7,600,870 B2 | 10/2009 | Zelazowski | |
| 2001/0033359 A1 | 10/2001 | Takagi | |

(Continued)

FOREIGN PATENT DOCUMENTS

GB          2338314        11/2002

OTHER PUBLICATIONS

International Search Report dated Aug. 27, 2015 on corresponding PCT International Application PCT/CA2015/000419.

(Continued)

*Primary Examiner* — Darryl J Collins
(74) *Attorney, Agent, or Firm* — Klintworth & Rozenblat IP LLC

(57) ABSTRACT

Eyewear according to one embodiment includes a primary frame retainer, at least one primary lens and a clip-on lens assembly removably attachable to the front of the primary frame by magnetic forces interacting between two magnets affixed to the primary frame and the clip-on lens assembly, respectively. The clip-on lens assembly includes a connector affixed to a secondary frame of the clip-on lens assembly. The connector has a hook removably engagable with a recess defined in the primary frame for positioning the clip-on lens assembly with respect to the primary frame.

10 Claims, 5 Drawing Sheets

(56) References Cited

U.S. PATENT DOCUMENTS

| | | |
|---|---|---|
| 2002/0131013 A1 | 9/2002 | Onami et al. |
| 2003/0223031 A1 | 12/2003 | Fukuwa |
| 2005/0062929 A1* | 3/2005 | Ng .................. G02C 9/00 351/47 |
| 2005/0078269 A1* | 4/2005 | Hsiao .............. G02C 9/00 351/47 |
| 2005/0088612 A1 | 4/2005 | Smith et al. |
| 2005/0174530 A1* | 8/2005 | Ifergan ............ G02C 9/00 351/57 |
| 2005/0248720 A1 | 11/2005 | Ng |
| 2006/0126007 A1 | 6/2006 | Smith |
| 2006/0203186 A1 | 9/2006 | Ifergan |
| 2006/0256280 A1* | 11/2006 | Lipawsky ........ G02C 9/04 351/47 |
| 2006/0290881 A1 | 12/2006 | Yu |
| 2007/0013863 A1 | 1/2007 | Zelazowski |
| 2007/0132942 A1 | 6/2007 | Zelazowski |
| 2007/0153228 A1* | 7/2007 | Zelman ........... G02C 9/00 351/47 |
| 2007/0236653 A1 | 10/2007 | Lee et al. |
| 2008/0002142 A1* | 1/2008 | Wang ............... G02C 9/00 351/57 |
| 2010/0060846 A1 | 3/2010 | Zelazowski |

OTHER PUBLICATIONS

International Search Report dated Aug. 31, 2015 on corresponding PCT International Application PCT/CA2015/000418.

* cited by examiner

EYEWEAR HAVING MAGNETIC CLIP-ON LENSES

TECHNICAL FIELD

The described subject matter relates generally to an improvement on a structure of eyewear and, more particularly, to a structure of eyewear having clip-on lenses.

BACKGROUND OF THE ART

Secondary lens assemblies which can be removably attached to the front of conventional eyewear, are popularly used to convert conventional eyewear to sunglasses. Among various designs magnets have been used for attaching secondary lens assemblies to conventional eyewear. For example, a conventional eyewear frame may include a magnetic material secured around the peripheral portion, facilitating attachment of a second lens assembly to the conventional eyewear frame, such as described in U.S. Pat. No. 4,070,103 of Meeker, or the magnets may be secured to the temporal portions of a conventional frame that mate with similar magnets in a secondary lens assembly, such as described in U.S. Pat. No. 5,416,537 of Sadler. Those magnets are embedded in portions of the eyewear frames in a vertical orientation for mating with similarly positioned magnets in the secondary lens assembly. These secondary lens assemblies are therefore held in place in front of the conventional eyewear frame only by the magnetic forces and are not supported to prevent the secondary lens assemblies from moving vertically relative to the conventional eyewear frames, which may allow unexpected detachment of the secondary lens assemblies from the conventional eyewear frames. Efforts have been made and continue to be made to address this problem.

There is a need to develop an improved design for eyewear with attachable secondary lens assemblies to overcome the shortcomings of the conventional designs thereof.

SUMMARY

In one aspect, there is provided an eyewear comprising: a primary frame having opposed side ends and retaining at least one primary lens, a support device being operatively attached to the respective opposed side ends of the primary frame for supporting the eyewear on a user's head, and a first magnet attached to a central location of an upper part of the primary frame extending between the opposed side ends; and a secondary lens assembly removably attachable to a front of the primary frame, the secondary lens assembly including: a secondary frame retaining at least one secondary lens, the secondary frame having an upper part extending between opposed side ends of the secondary frame; and a connector affixed to a central location of the upper part of the secondary frame and including a second magnet to allow the connector to be removably attached to a central location of the upper part of the primary frame by magnetic forces interacting between the first and second magnets, wherein the connector includes a hook and the primary frame includes a recess at the central location, the hook being slidable downwardly relative to the recess to engage with the recess for positioning the secondary lens assembly with respect to primary frame.

In another aspect, there is provided an eyewear comprising: a primary frame having opposed side ends and including primary left and right sections retaining a pair of primary lenses, respectively, a first nose bridge being disposed between and interconnecting the primary left and right sections, a support device being operatively attached to the respective opposed side ends of the primary frame for supporting the eyeglasses on a user's head, the first nose bridge including a first magnet; and a secondary lens assembly removably attachable to a front of the primary frame, the secondary lens assembly including: a secondary frame including secondary left and right sections retaining a pair of secondary lenses, respectively, a second nose bridge being disposed between and interconnecting the secondary left and right sections; and a connector affixed to the second nose bridge of the secondary frame and including a second magnet to allow the connector to be removably attached to the first nose bridge of the primary frame by magnetic forces interacting between the first and second magnets, wherein the connector includes a hook and the first nose bridge of the primary frame includes a recess, the hook being slidable downwardly relative to the recess to engage with the recess for positioning the secondary lens assembly with respect to primary frame.

DESCRIPTION OF THE DRAWINGS

Reference is now made to the accompanying drawings, showing by way of illustration the described embodiments thereof in which.

It will be noted that throughout the appended drawings, like features are identified by like reference numerals.

DETAILED DESCRIPTION

Figure 1:
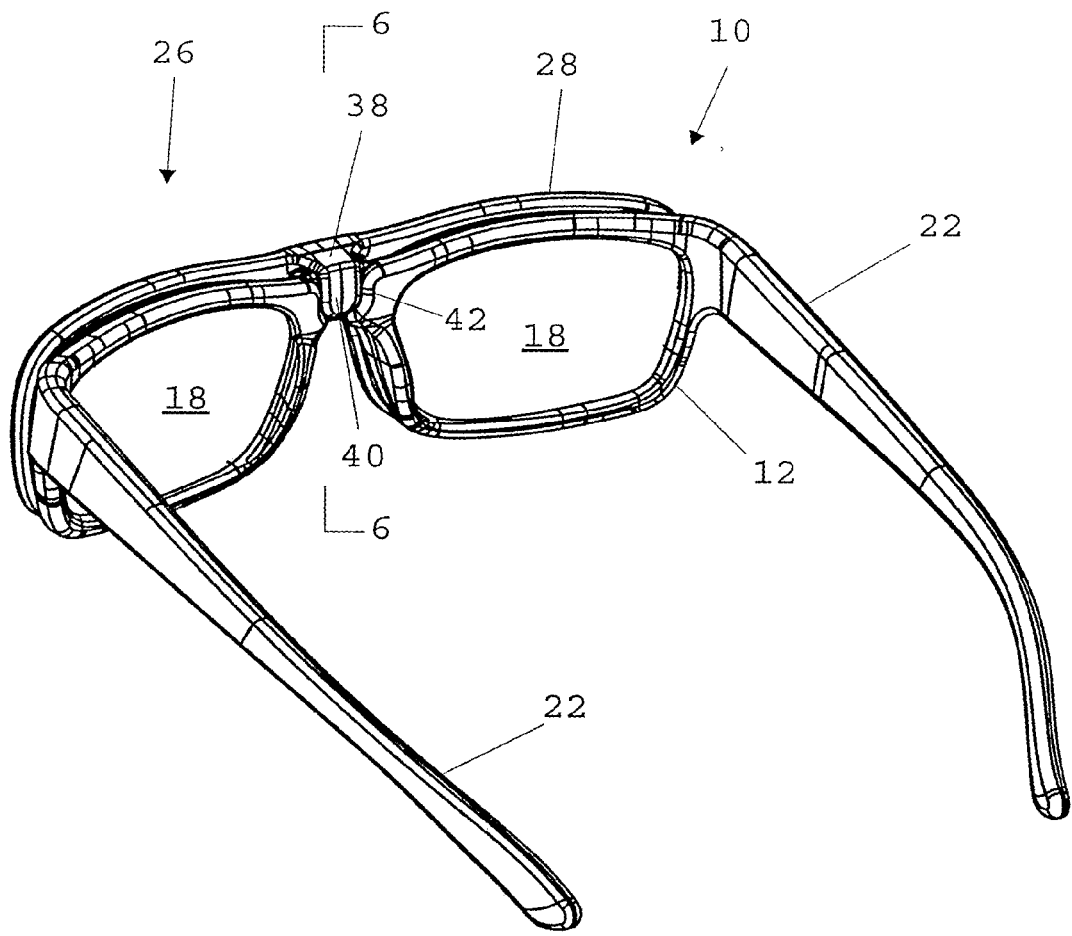
FIG. 1 is an isometric view of eyewear with a clip-on lens assembly according to one embodiment.
Figure 3:
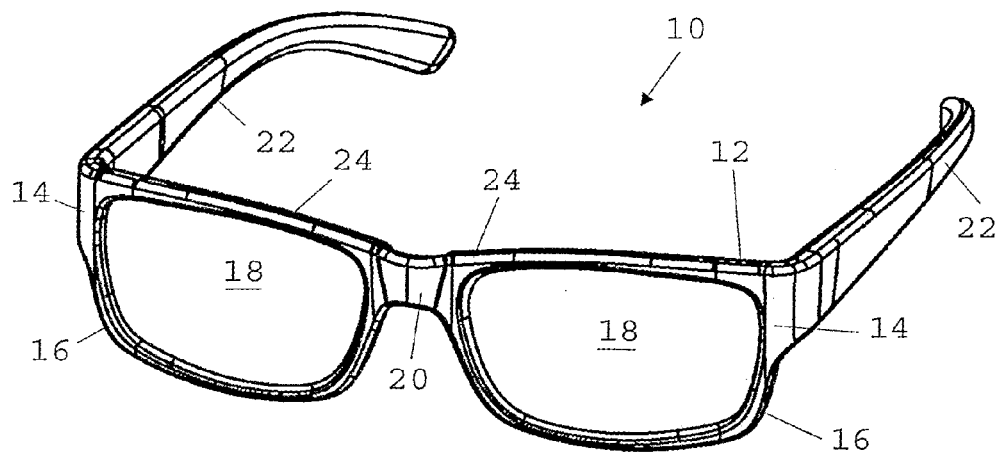
FIG. 3 is a front isometric view of the primary structure of FIG. 2.
Figure 2:
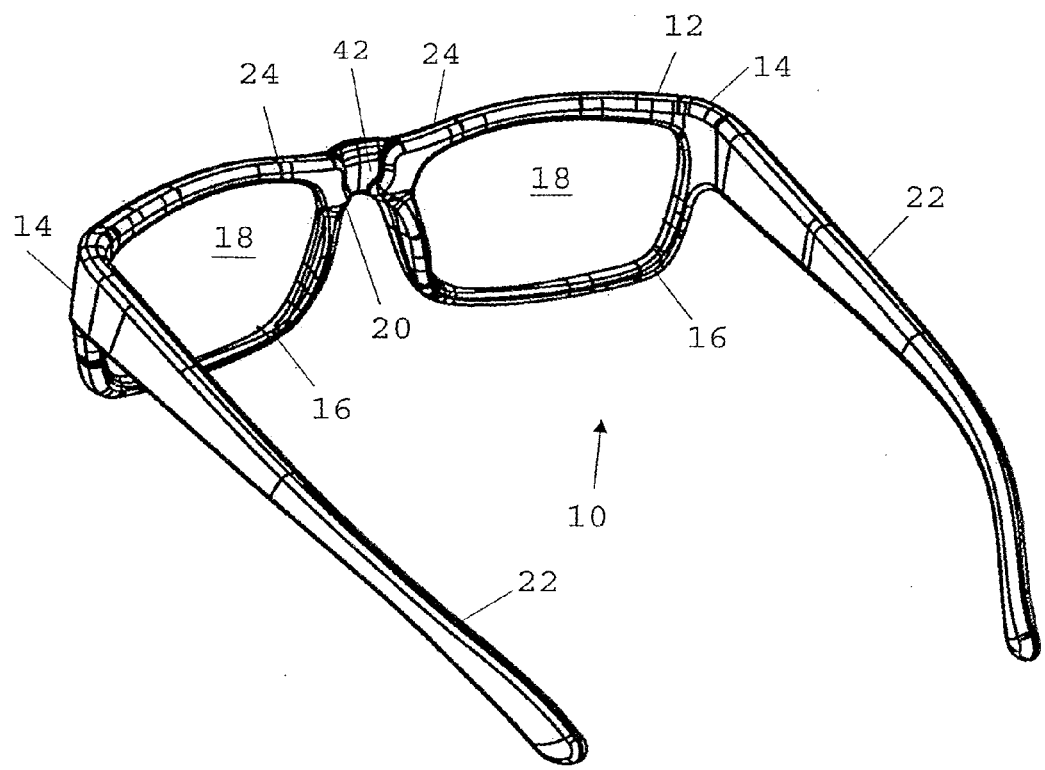
FIG. 2 is a rear isometric view of the eyewear of FIG. 1 with the clip-on lens assembly removed, showing the back side of the primary frame structure.

Referring to FIGS. 1-3, eyewear 10 according to one embodiment, generally includes a primary frame 12 which for example may be made of a rigid plastic material in a molding process, having opposed side ends 14 for retaining at least one primary lens. In this embodiment the primary frame 12 includes primary left and right sections 16 for retaining a pair of primary lenses 18, respectively. A nose bridge 20 is disposed between and interconnects the primary left and right sections 16 of the primary frame 12. A support device, for example a pair of temples 22, may be pivotally attached to the respective opposed side ends 14 of the primary frame 12 for supporting the eyewear 10 on a user's head. It should be noted that the nose bridge 20 may be made out of a semi-rigid flexible material and connected to the rest of the frame 12 adhesively or by mechanical engagement or otherwise contemplated by someone skilled in the art.

The primary left and right sections 16 of the primary frame 12 according to one embodiment, may be configured as an endless rim surrounding each primary lens 18. Alternatively, the primary left and right sections 16 of the primary frame 12 may be configured to have only an upper part 24 of the rims which engages only an upper section of a peripheral edge of the respective primary lenses 18.

Figure 5:
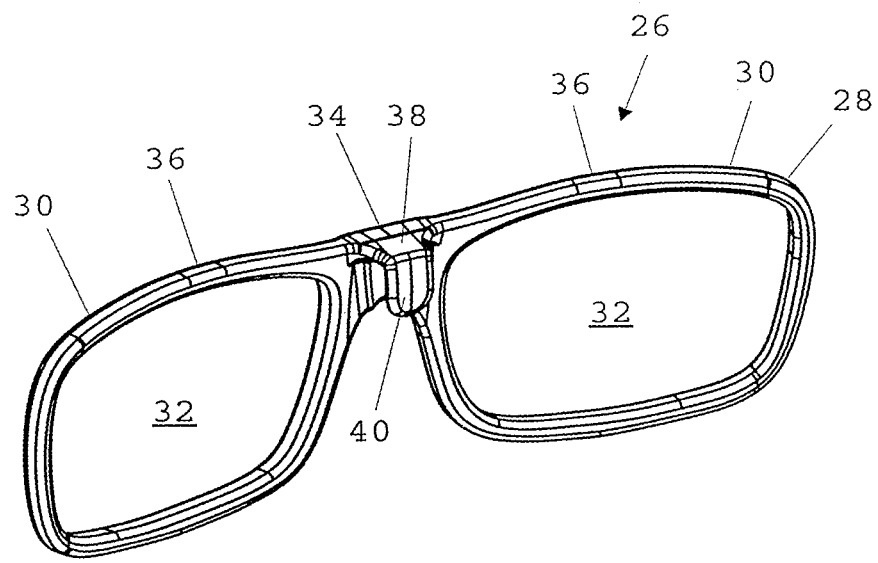
FIG. 5 is a rear isometric view of the clip-on lens assembly of FIG. 4.
Figure 4:
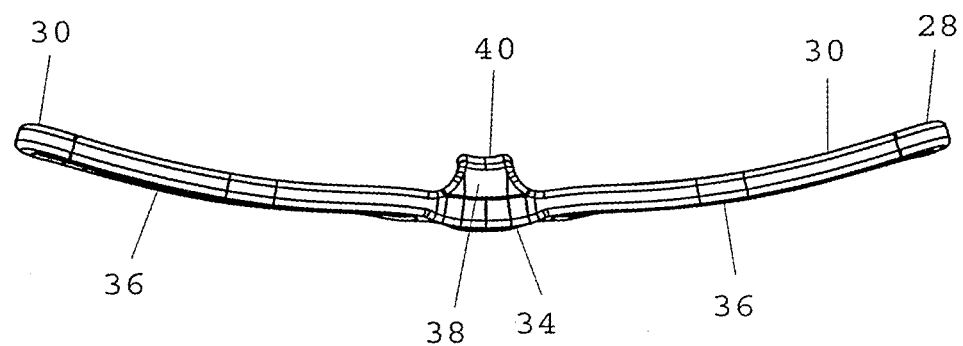
FIG. 4 is a top plan view of the clip-on lens assembly of FIG. 1.

Referring to FIGS. 1, 4 and 5, a clip-on lens assembly 26 (secondary lens assembly) according to one embodiment, may include a secondary frame 28 retaining at least one secondary lens. In this embodiment the secondary frame 28 may include secondary left and right sections 30 thereof for retaining a pair of secondary lenses 32, respectively, which, for example may be tinted for protecting a user's eyes from the sun. A nose bridge 34 may be disposed between and interconnect the secondary left and right sections 30 of the secondary frame 28.

The secondary left and right sections 30 of the secondary frame 28 may be configured in an endless rim configuration, corresponding with the primary left and right sections 16 of the primary frame 12. Alternatively, the secondary left and right sections of the secondary frame 28 may also be configured to have only an upper part 36 which engages only with a corresponding upper section of a peripheral edge of the respective secondary lenses 32.

Figure 6:
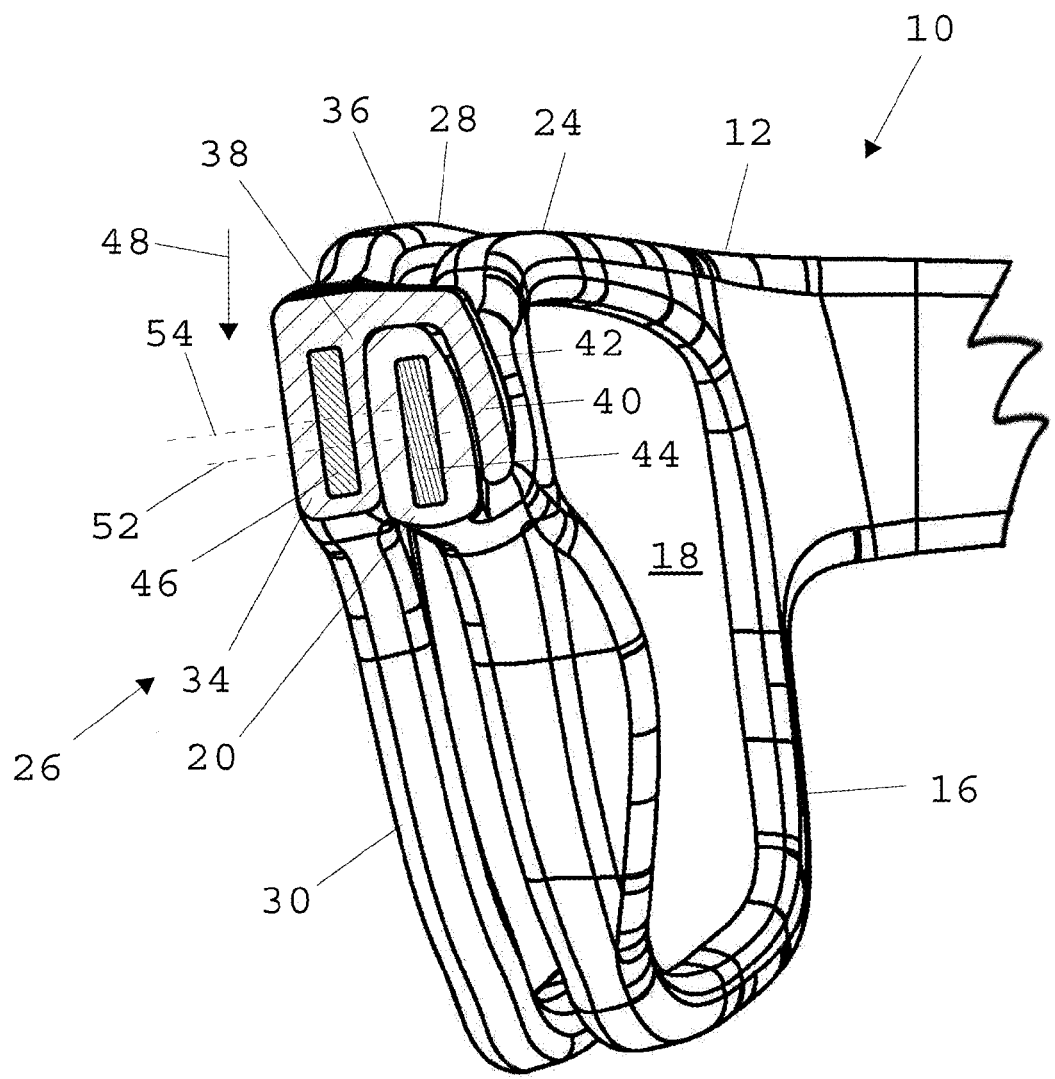
FIG. 6 is a partial cross-sectional view taken along line 6-6 of FIG. 1, showing attachment of the clip-on lens assembly to the primary frame of the eyewear.
Figure 7:
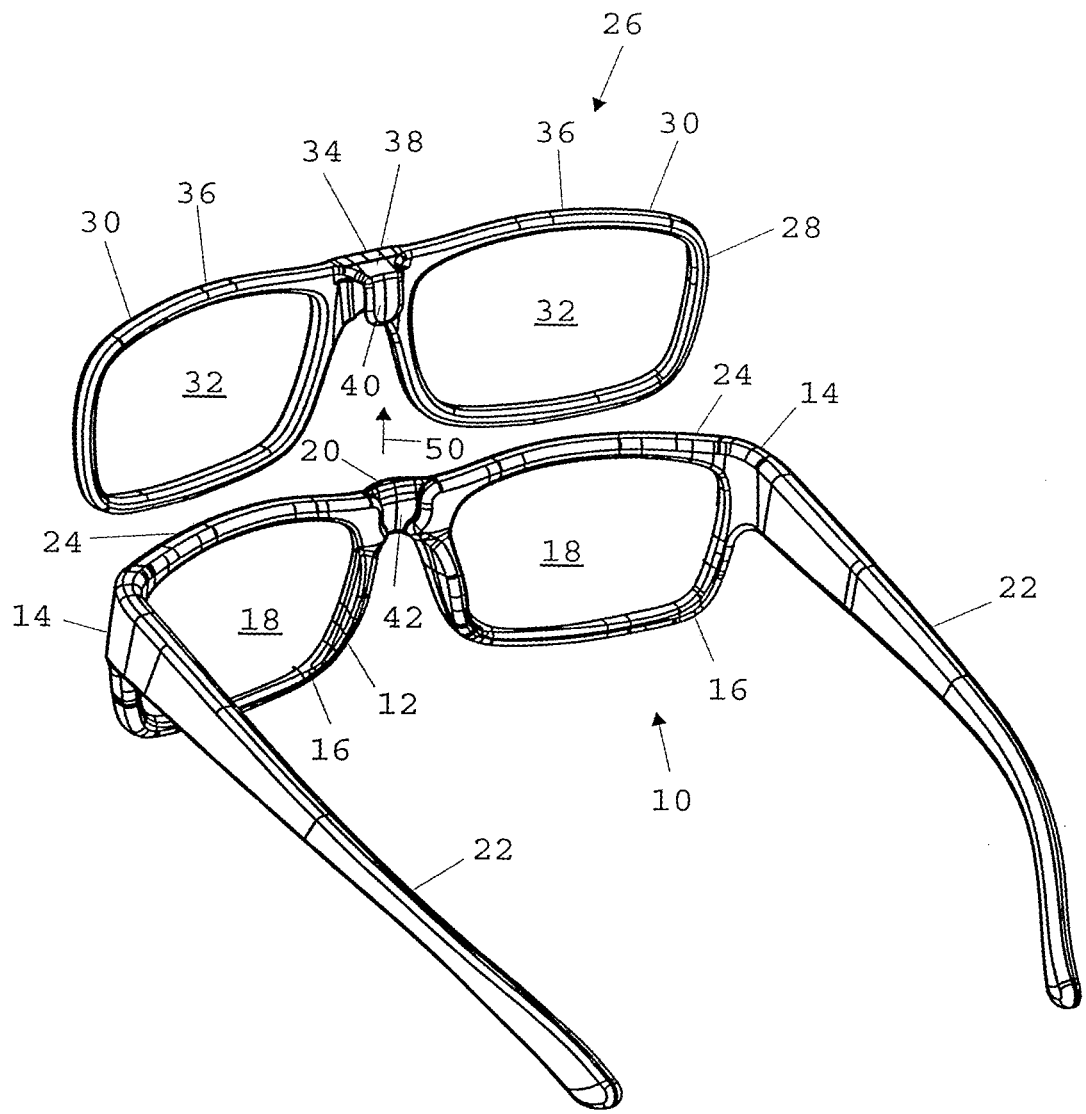
FIG. 7 is a rear isometric view of the eyewear of FIG. 1 with the clip-on lens assembly moved upwardly to be detached from the primary frame of the eyewear.

Referring to FIGS. 1-7, the clip-on lens assembly 26 according to one embodiment, may include a connector 38 affixed to a central location of an upper part of the secondary frame 28, such as the nose bridge 34. The connector 38 may include a hook (not numbered) and the primary frame 12 may have a recess 42 at a central location of the primary frame 12, for example in the nose bridge 20 at a back side of the nose bridge 34 facing a user's face. The hook of the connector 38 may be slidable downwardly relative to the recess 42, to engage with the recess 42 for positioning the clip-on lens assembly 26 with respect to the primary frame 12. When the clip-on lens assembly 26 is positioned in place as shown in FIG. 6, the clip-on lens assembly 26 is removably secured to the front of the primary frame 12 by magnetic forces interacting between a first magnet 44 affixed for example to the nose bridge 20 of the primary frame 12, and a second magnet 46 affixed for example to the connector 38 of the secondary frame 28.

The connector 38 according to one embodiment, may be integrated with the nose bridge 34 of the secondary frame 28 and in combination with the nose bridge 34, may be configured in an inverted U-shaped configuration to form such a hook. For example, the inverted U-shaped configuration connector 38 may be formed with the nose bridge 34 in a molding process of the secondary frame 28 when the secondary frame 28 is made of a plastic material. The nose bridge 20 of the primary frame 12 may slide upward into the inverted U-shaped configuration of the connector 38, when the connector 38 is engaged with the recess 42 of the primary frame 12. The recess 42 may be defined at a back side of the nose bridge 20 of the primary frame 12, for receiving a positioning member 40 (see FIGS. 1 and 4-7 (one leg of the inverted U-shaped configuration of the connector 38), which may slide downwardly into the recess 42. The recess 42 may have a shape complementary to the shape of the positioning member 40 (the leg of the inverted U-shaped configuration of the connector 38) allowing accurate positioning of the clip on lens assembly 26 in front of the primary frame 12. Therefore, the positioning member 40 when fitted within the recess 42, may position the clip-on lens assembly 26 such that the nose bridge 34 of the secondary frame 28 substantially aligns with the nose bridge 20 of the primary frame 12.

The magnets 44, 46 according to one embodiment may be shaped as a slightly curved plate following the curvature of the nose bridge 20, and may be embedded for example in the nose bridge 20 of the primary frame 12 and in the connector 34 of the secondary frame 28, respectively, during molding formation processes of the respective nose bridge 20 and connector 34. The magnet 46 may also be located in the nose bridge 34 because the nose bridge 34 is an integral part of the connector 38 according to this embodiment. The magnets 44 and 46 may be substantially vertically positioned such that polarity orientations of the magnets 44, 46 indicated by respective lines 52, 54 (see FIG. 6), are substantially normal to the respective primary lenses 18 and the secondary lenses 32 (or the respective planes defined by the primary lenses 18 and the secondary lenses 32).

Optionally, the positioning member 40 of the connector 38 according to one embodiment, may be configured to be fitted into the recess 42 of the nose bridge 20 in order to allow the magnet 46 affixed to the connector 38 and the magnet 44 affixed to the nose bridge 20 of the primary frame 12, to be aligned one with the other, thereby creating maximum magnetic forces interacting therebetween for a secure attachment of the clip-on lens assembly 26 to the primary frame 12 of the eyewear 10.

Alternatively, the positioning member 40 of the connector 38 according to another embodiment, may be configured to be fitted into the recess 42 such that the magnet 46 affixed to the connector 38 and the magnet 44 affixed to the nose bridge 20 of the primary frame 12, are placed within a magnetic force interaction area therebetween but are not perfectly aligned. The magnet 44 according to one embodiment, may be positioned slightly lower relative to the position of the magnet 46, as shown in FIG. 6. In such a magnet position arrangement, because the magnets 44, 46, are not perfectly aligned, the magnetic forces interacting between the magnets 44, 46 tend to pull the magnet 46 downwardly toward alignment with the magnet 44. This downward magnetic force as shown by arrow 48, advantageously secures the clip-on lens assembly 26 in position, against a potential pulling up motion (indicated by arrow 50 in FIG. 7) when the clip-on lens assembly 26 is being detached from the front of the primary frame 12.

Alternatively, when the eyewear and the corresponding clip-on eyewear assembly each have a unitary lens without the respective nose bridges, the magnets, connector and recess may be positioned in a central location of an upper part of the respective primary, and secondary frames.

The above description is meant to be exemplary only, and one skilled in the art will recognize that changes may be made to the embodiments described without departing from the scope of the described subject matter. The eyewear may be configured in various styles different from what is illustrated in the drawings. Modifications which fall within the scope of the described subject matter will be apparent to those skilled in the art, in light of a review of this disclosure, and such modifications are intended to fall within the appended claims.

The invention claimed is:

1. Eyewear comprising:
    a primary frame having opposed side ends and retaining at least one primary lens, a support device being operatively attached to the respective opposed side ends of the primary frame for supporting the eyewear on a user's head, and a first magnet attached to a central location of an upper part of the primary frame extending between the opposed side ends; and
    a secondary lens assembly removably attachable to a front of the primary frame, the secondary lens assembly including:
        a secondary frame retaining at least one secondary lens, the secondary frame having an upper part extending between opposed side ends of the secondary frame;

a connector affixed to a central location of the upper part of the secondary frame and including a second magnet to allow the connector to be removably attached to a central location of the upper part of the primary frame by magnetic forces interacting between the first and second magnets, wherein the connector includes a hook and the primary frame includes a recess at the central location, the hook being slidable downwardly relative to the recess to engage with the recess for positioning the secondary lens assembly into a position of attachment with respect to the primary frame; and wherein in said position of attachment the first and second magnets are within a magnetic interaction area between the first and second magnets and are prevented from being fully aligned one with another when the hook is fully engaged with the recess.

2. The eyewear as defined in claim 1 wherein a polarity orientation of the first and second magnets is in a line substantial normal to the at least one primary lens and at least one secondary lens, respectively.

3. The eyewear as defined in claim 1 wherein in said position of attachment the first magnet is positioned lower than the second magnet.

4. Eyewear comprising:
a primary frame having opposed side ends and including primary left and right sections retaining a pair of primary lenses, respectively, a first nose bridge being disposed between and interconnecting the primary left and right sections, a support device being operatively attached to the respective opposed side ends of the primary frame for supporting the eyeglasses on a user's head, the first nose bridge including a first magnet; and
a secondary lens assembly removably attachable to a front of the primary frame, the secondary lens assembly including:
a secondary frame including secondary left and right sections retaining a pair of secondary lenses, respectively, a second nose bridge being disposed between and interconnecting the secondary left and right sections;

a connector affixed to the second nose bridge of the secondary frame and including a second magnet to allow the connector to be removably attached to the first nose bridge of the primary frame by magnetic forces interacting between the first and second magnets, wherein the connector includes a hook and the first nose bridge of the primary frame includes a recess, the hook being slidable downwardly relative to the recess to engage with the recess for positioning the secondary lens assembly into a position of attachment with respect to primary frame; and wherein in said position of attachment the first and second magnets are within a magnetic interaction area between the first and second magnets and are prevented from being fully aligned one with another when the hook is fully engaged with the recess.

5. The eyewear as defined in claim 4 wherein the hook comprises a positioning member fitted within the recess when the hook is engaged with the recess, maintaining the first and second magnets in the mis-aligned condition.

6. The eyewear as defined in claim 4 wherein the recess is configured complementary to a positioning member of the hook, the positioning member of the hook being slidable downwardly into the recess.

7. The eyewear as defined in claim 4 wherein the recess is located at a back side of the nose bridge facing a user's face.

8. The eyewear as defined in claim 4 wherein the connector is integrated with the second nose bridge to form an inverted U-shaped configuration.

9. The eyewear as defined in claim 4 wherein in said position of attachment the first magnet is positioned lower than the second magnet.

10. The eyewear as defined in claim 4 wherein the first magnet is positioned to have a polarity orientation thereof in a first line substantially normal to the primary lenses and wherein the second magnet is positioned to have a polarity orientation thereof in a second line substantially normal to the secondary lenses.

* * * * *